July 17, 1956  A. E. JENNENS  2,755,052
PAINT BRUSH HOLDER
Filed Sept. 22, 1952  3 Sheets-Sheet 1
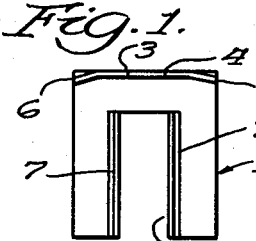
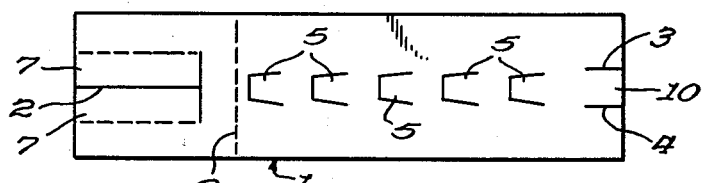
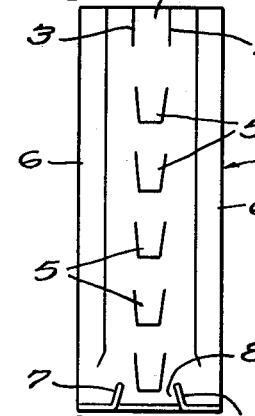
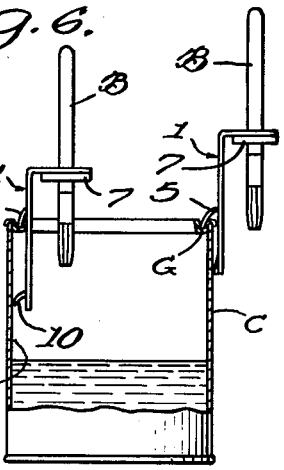
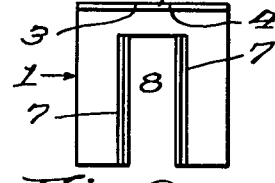
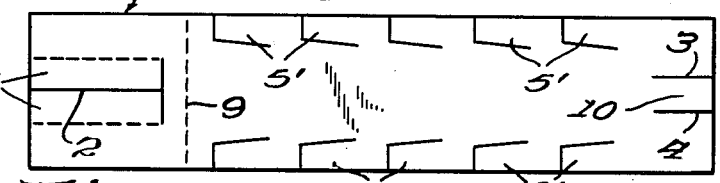
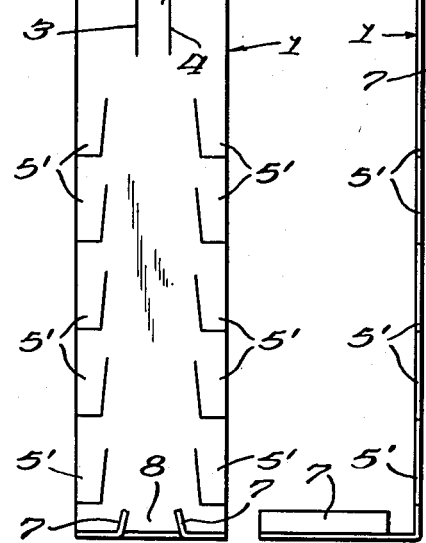
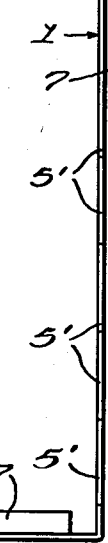
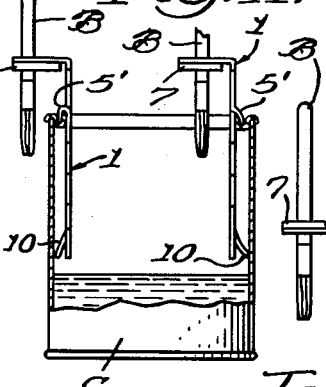
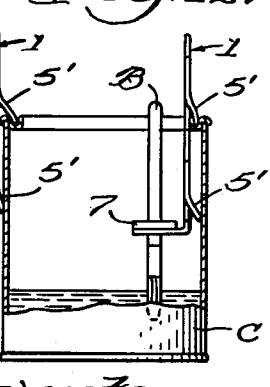
Inventor:
Arthur E. Jennens.
By Harold J. DeVescouto
Atty.

July 17, 1956  A. E. JENNENS  2,755,052
PAINT BRUSH HOLDER
Filed Sept. 22, 1952  3 Sheets-Sheet 2
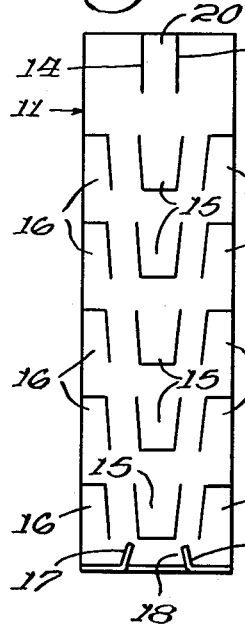
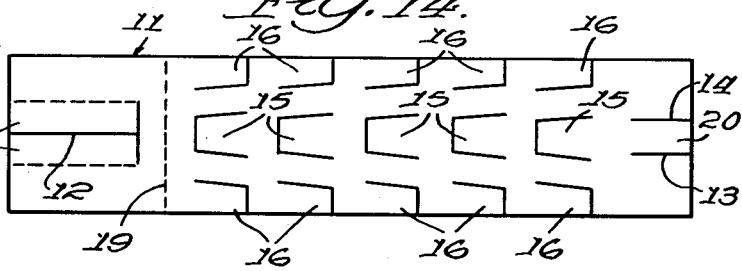
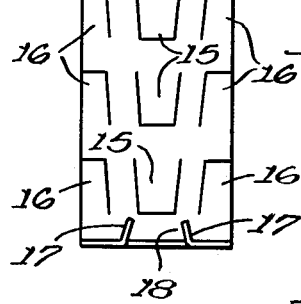
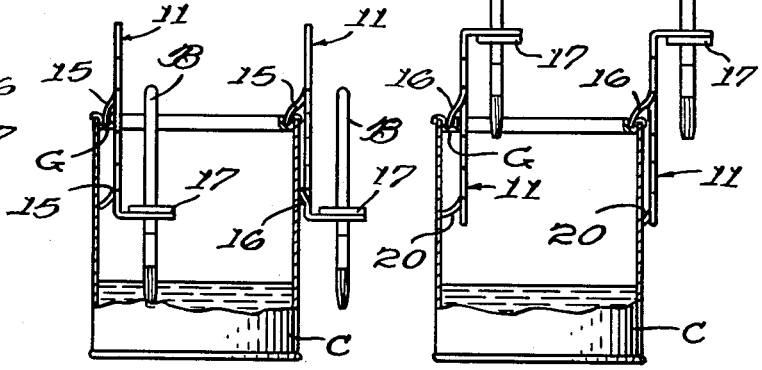
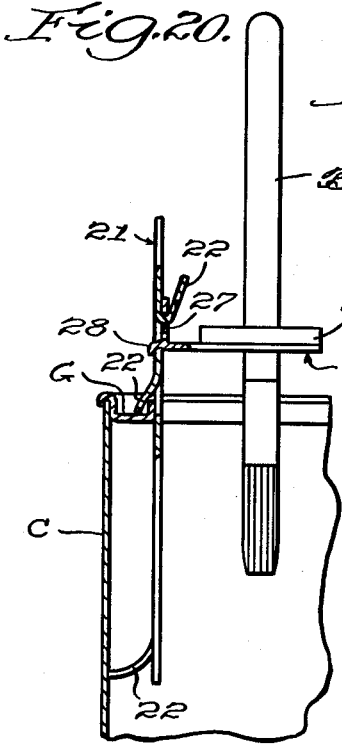
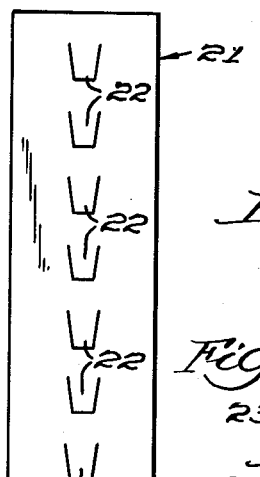
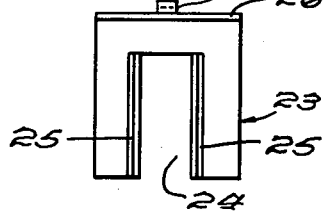
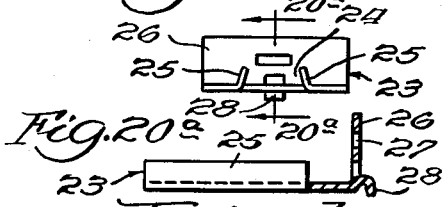
Inventor:
Arthur E. Jennens
By Harold J. Lellescoute
Atty.

July 17, 1956 A. E. JENNENS 2,755,052
PAINT BRUSH HOLDER
Filed Sept. 22, 1952 3 Sheets-Sheet 3
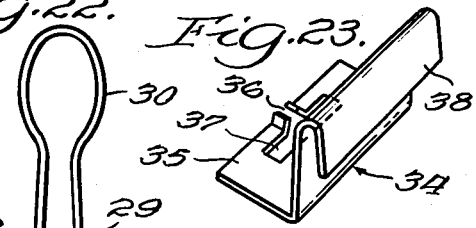
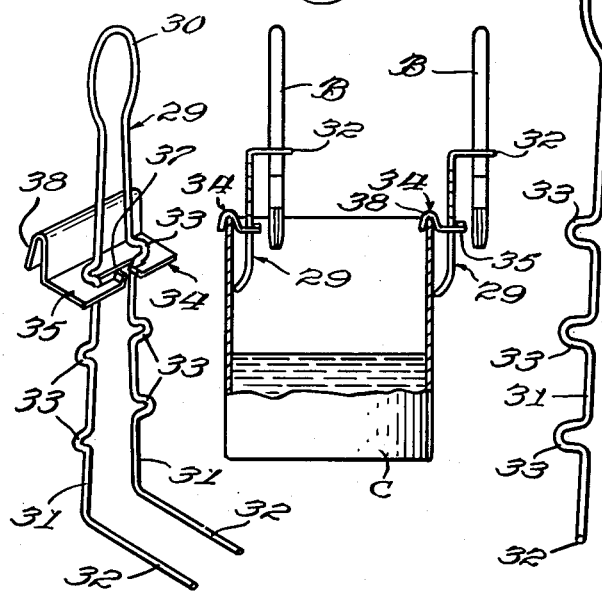
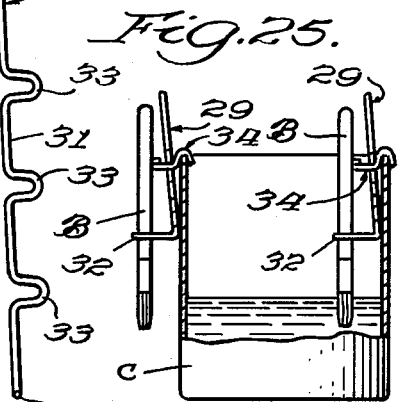
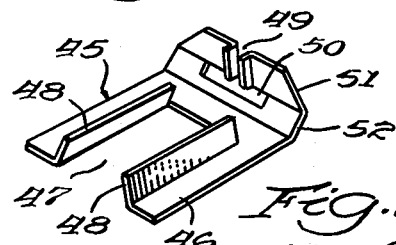
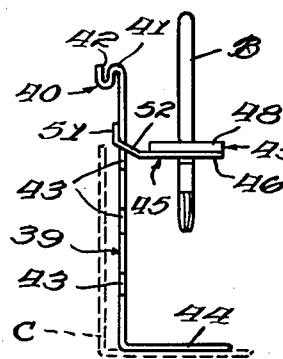
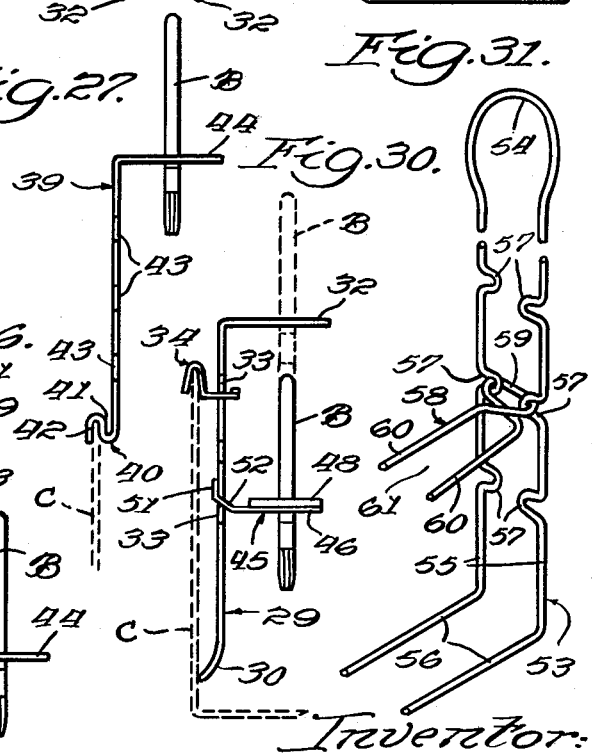
Inventor:
Arthur E. Jennens
By Harold J. LeVescont
Atty.

United States Patent Office 2,755,052
Patented July 17, 1956

2,755,052

PAINT BRUSH HOLDER

Arthur E. Jennens, Whittier, Calif.

Application September 22, 1952, Serial No. 310,898

3 Claims. (Cl. 248—113)

This invention relates to painting equipment and particularly to a novel form of paint brush holder.

It is frequently necessary in painting operations to lay the brush down and also at the completion of work it is necessary to clean the brush or to allow it to stand in a suitable solvent. In any such event it is desirable to suspend the brush so as not to smear a surface and in placing the brush in solvent it is desirable to suspend the brush so that the paint pigment may settle out of the bristles to the bottom of the container, and so that the bristles are not deformed from supporting the weight of the brush and are maintained in a soft, pliable condition ready for immediate use.

It is appreciated that the basic idea for paint brush holders for the above purposes is not new and the present invention has for its principal object the provision of a paint brush holder of simple design which may readily be adapted by the user for any one of a wide variety of brush holding duties at various elevations in or above a container of paint or solvent with the brush disposed either in the container, directly over the container, or at the side thereof as may be desired.

Another object of the invention is to provide a paint brush holder formed from a single strip of deformable material including portions which may be bent out of the plane of the strip to form container engaging tabs.

Another object of the invention is to provide a paint brush holder which may be employed to hold the paint brush suspended either outside or inside of a container and at selectively different levels.

A further object of the invention is to provide a paint brush holder constructed and arranged to hold a paint brush suspended from the side of a container and including a container engaging component formed of wire.

Still another object of the invention is to provide a paint brush holder adapted to hold a paint brush suspended either inside or outside of a container and which holder is formed of a single piece of wire.

With the foregoing objects in view, together with such other objects and advantages as may subsequently appear, the invention resides in the parts, and in the construction, combination, and arrangement of parts disclosed, by way of example, in the following specification of certain modes of execution of the invention; reference being had to the accompanying drawings which form a part of said specification and in which drawings:

Figs. 1 to 16, inclusive show a first form of the invention in which the invention is formed from a single piece of sheet material and of which Figs. 1 to 6, inclusive, illustrate one embodiment of the said first form of the invention wherein:

Fig. 1 is a top plan view of said one embodiment of the first form of the invention, Fig. 2 is a front elevation, Fig. 3 is an edge elevation, Fig. 4 is a flat development of the sheet metal blank, and Figs. 5 and 6 illustrate various modes of use of said one embodiment of the first form of the invention.

Figs. 7 to 12, inclusive illustrate a second embodiment of said first form of the invention wherein Fig. 7 is a top plan view, Figs. 8 and 9 are front and edge elevations, respectively, Fig. 10 is a flat development of the strip from which the paint brush holder is formed, and Figs. 11 and 12 illustrate modes of use of said second embodiment.

Figs. 13 to 16, inclusive illustrate a third embodiment of said first form of the invention wherein Fig. 13 is a front elevation, Fig. 14 is a flat development of the strip from which said third embodiment is formed, and Figs. 15 and 16 illustrate modes of use of said third embodiment of said first form of the invention.

Figs. 17 to 20, inclusive illustrate a second form of the invention characterized by the use of a separate brush holding element adjustably mountable on the container engaging portion of the device and wherein Fig. 17 is a side elevation of the container engaging portion of the said second form of the invention, Figs. 18 and 19 are top plan and front views, respectively, of the brush engaging component, Fig. 20 is a view illustrating a representative mode of use of the said second form of the invention; a portion of the device being broken away for clearness of illustration, and Fig. 20a is a sectioned view taken on the line 20a—20a of Fig. 19.

Figs. 21 to 31, inclusive illustrate a third form of the invention employing wire in whole and in part for the device in place of the sheet metal employed in the previously illustrated forms comprising three embodiments of said third form of which:

Figs. 21 to 25, inclusive, illustrate the first embodiment of said third form wherein Fig. 21 is a perspective view, Fig. 22 is a front elevation.

Fig. 23 is a perspective top view of the separate sheet metal container engaging component, and Figs. 24 and 25 are views illustrating various modes of use of the embodiment shown in Figs. 21, 22 and 23.

Figs. 26 and 27 illustrate a second embodiment of the third form of the invention in which the separate container engaging component is dispensed with and incorporated in the wire component; the views being in edge elevation and incidentally showing different modes of use.

Figs. 28, 29 and 30 show a separate sheet metal brush holding component usable with either of the wire components shown in Figs. 21 to 27, inclusive, wherein Fig. 28 is a top perspective view of the sheet metal brush holder, Fig. 29 shows the brush holder applied to a wire component of the type shown in Figs. 26 and 27, and Fig. 30 shows the brush holding component applied to a wire component of the type shown in Figs. 21 and 22.

Fig. 31 is a fragmentary showing of a third embodiment of the third form of the invention characterized by a different formation of the wire component together with a separate brush holding also formed of wire.

Referring first to the first form of the invention and particularly to the embodiment thereof shown in Figs. 1 to 6, inclusive, the device comprises a strip 1 of deformable material such as sheet metal having a T-shaped slit 2 formed in one end thereof with the portion of said slit forming the stem of the T disposed along the longitudinal medial line of the strip. Additionally, the opposite end of the strip is provided with a pair of spaced longitudinally extending slits 3 and 4 and between the inner ends of the slits 2, 3 and 4 the medial portion of the strip is provided with a plurality of longitudinally extending and longitudinally spaced tongues 5 the free ends of which extend toward the T-shaped slit 2. The side edges of the strip opposite the tongues 5 and slits 3 and 4 may be slightly bent as at 6 to provide stiffness to that portion of the strip.

In use, the device may be furnished to the user as a flat strip as shown in Fig. 4 and the user bends the tabs 7 formed by the T-shaped slit 2 out of the plane of the strip to form a brush handle receiving slot 8; the width of the slot being determined by the extent to which the tabs 7 are bent to accommodate the handle of the brush to be held thereby. The user next bends the strip at right angles to the length thereof as along the line 9 in Fig. 4 adjacent to the inner end of the slit 2 as best shown in Fig. 3 and the device is prepared for use.

Various modes of use are shown in Figs. 5 and 6. At the left hand side of Fig. 5, the device is shown arranged to hold a brush B inside the paint container at a level within the container. This is effected by bending out one of the tongues 5 to engage the lid engaging groove G in the container C and also bending the lowermost of the tongues 5 to engage the inner sidewall W of the container. The tongue selected for engagement with the groove G is that which will locate the brush at the desired level. If it is desired to locate the brush alongside the outside of the container, the lowermost tongue need not be thus bent out as shown at the right hand side of Fig. 5. When it is desired to locate the brush above the top of the container, the tongues are bent back on themselves as shown in Fig. 6 and the device is inverted. When the brush is to be disposed over the container C, the end tongue 10 formed by the slits 3 and 4 is also bent outwardly as shown at the left hand side of Fig. 6 and if the brush is to be located outside of the container, this bending out of the tongue 9 may be dispensed with as shown at the right hand side of Fig. 6. When further use of the device is to be made, the displaced tongues may be bent back into place and other of the tongues be bent out to suit the new intended use.

Referring next to the second embodiment of the first form of the invention as shown in Figs. 7 to 12, inclusive, the general arrangement of the device is the same and all identical parts have been given the same numbers. The difference is that the tongues 5' have been arranged in pairs along the opposite sides of the strip 1 instead of along the medial line as in the first embodiment. This gives the holder somewhat more stability especially when it is used to support a brush above the level of the container as illustrated in Fig. 11. The mode of use and the capacity for adjustment to various sizes of brush handles and for various levels relative to the container is the same as has been previously described and need not be repeated.

The third embodiment of the first form of the invention is shown in Figs. 13 to 16, inclusive. In this form of the invention a metal strip 11 is provided with a T-shaped slit 12 at one end thereof and with spaced longitudinal slits 13 and 14 at the other end thereof corresponding to the slits 2, 3 and 4 respectively of the first and second embodiments, respectively. The intermediate portion of the strip is provided with a series of tongue elements 15 which correspond to the tongues 5 shown in Figs. 1 to 6 and the side edges are provided with pairs of tongues 16 which are arranged to point toward the end of the strip having the slits 13 and 14 as shown in Figs. 13 and 14. In use the tabs 17 formed by the T-shaped slit 12 are bent outwardly to form a brush handle receiving slot 18, the strip is bent at right angles along the line 19 and if the brush is to be held below the edge of the container, the appropriate tongue 15 is bent out to engage the groove G of the container and either the lowermost tongue 15 or the lowermost pair of the tongues 16 are bent out to engage the container wall as shown at the left hand side of Fig. 15. If the brush is to be disposed below and at the outside of the container the desired tongue 15 is likewise bent out and if necessary, the lower tongues 16 are bent out to assist in resisting any tendency of the brush and holder to swing. If the brush is to be disposed above the level of the container, the appropriate pair of tongues 16 is displaced for engagement with the groove on the container top edge and the tongue 20 formed by the slits 13 and 14 is likewise bent out to engage the sidewall of the container as shown in Fig. 16. The advantages of the last described embodiment are that the tongues need not be rebent to point in the opposite direction and in those instances in which the brush is to be disposed above the top of the container, the support afforded by the spaced pair of tongues contributes to the stability of the holder.

It is particularly to be noted that the first form of the invention in all embodiments thereof is adapted for manufacture without waste of material and may be produced either on a punch press or on rolling dies. While for maximum convenience and lower cost of manufacture, the holders may be delivered to the user in flat condition as described, it is obvious that the manufacture may include the formation of the brush holding slot and tabs and the right angle bend adjacent thereto, if desired.

The second form of the invention is shown in Figs. 17 to 20 inclusive, and differs from the first form in that the container engaging and brush holding components are formed as separate pieces. The container engaging component 21 is formed from a flat strip of metal having a series of longitudinally disposed tongue elements 22 along the medial line thereof. The brush holding component 23 is formed from sheet metal and comprises a brush handle receiving slot 24 bordered by upstanding tabs 25, 25. At the end thereof opposite the open end of the slot, the metal is bent upwardly as at 26 and this portion 26 is provided with a tongue receiving slot 27 and with a rearwardly and thence downwardly extending hook 28. The assembly of the components is shown in Fig. 20. One of the tongues 22 is bent forwardly and upwardly and the brush holding component is mounted thereon with the tongue extending through the slot 27 and the hook 28 engaging the bottom of the slot formed by the displacement of the tongue 22. The selected tongue 22 is then bent rearwardly to engage the groove G in the container top and if desired the lowermost tongue 22 may also be bent outwardly to engage the container sidewall. The arrangement permits a high degree of adjustment since both the position of the container engaging component and the position of the brush holding component thereon can be varied at will.

Referring next to the third form of the invention and particularly the first embodiment thereof shown in Figs. 21 to 25 inclusive, the brush holding component 29 is formed of a length of wire doubled on itself to form a loop 30 with substantially parallel leg portions 31 extending therefrom terminating in parallel end portions 32 extending at right angles to the leg portions and serving as brush handle engaging and supporting means as shown in Figs. 24 and 25. The leg portions 31 are provided with a series of opposed pairs of laterally oppositely extending return bends 33 which serve as stops for the container engaging component 34 best shown in Fig. 23. The container engaging component 34 is formed from sheet metal and comprises a flat base portion 35 having a T-shaped slot 36 slightly wider than the diameter of the wire forming the component 29 and having the stem portion extending inwardly from the edge thereof with the head portion 37 of said slot being disposed parallel to the edge of said base portion. The base portion 35 beyond the end of the slot 36 is bent upwardly at a sharp right angle and thence in a return bend 38 providing a container edge engaging end in which the edge of the container may be received in the return bend as shown in Figs. 24 and 25 or in which the downwardly directed end may engage the groove G of a container as shown for example in Figs. 5 and 6. In use the container engaging component is placed on the brush holding component with a pair of the return bends 33 disposed above the T-slot 37 and with the end portions 32 disposed either above the component 34 as shown in Fig. 24 or below as shown in Fig. 25 as is desired for the particular use. In the event that the assembly is used to support a brush above the container as shown in Fig. 24, the loop end 30 may be bent toward the container wall to maintain the brush holding component in a vertical position. The brush handle is inserted between the end portions 32, 32 as shown in Figs. 24 and 25.

Referring next to the second embodiment of the third form of the invention illustrated in Figs. 26 and 27, the wire, brush holding component 39 is formed generally along the same lines as the component 29 except that the loop portion 40 thereof corresponding to the loop 30 of the component 29 above described is formed with a double reverse bend forming container edge engaging loops 41 and 42 which may be employed respectively to mount the brush holding component alongside the side wall of a container and on either side thereof as shown in Fig. 26 or above the container with the brush disposed over the container or at one side thereof as shown in Fig. 27. The leg portions of the component 39 may include opposed return bend portions 43 corresponding to the return bend portions 33 of the component 29 and the ends of the leg portions terminate in laterally extending brush handle engaging end portions 44 corresponding to the portions 32 of the component 29.

Referring next to Figs. 28, 29 and 30 there is shown a separate brush holding component 45 usable with either of the wire components 29 or 39. The brush holding component 45 is formed from a sheet metal blank and comprises a brush handle engaging portion 46 having a brush handle receiving slot 47 bordered by upstanding flanges 48, 48 which may be bent toward and away from each other to accommodate varying sizes of brush handles in the manner previously described in connection with the first described forms of the invention. At the edge of the sheet metal blank opposite the edge from which the slot 47 extends, the blank is further provided with a T-shaped slot the stem portion 49 of which extends from said opposite edge toward the slot 47 with the head portion 50 of the slot disposed at right angles to the portion 49 thereof. The portion 51 of the blank through which the portion 49 of the T-slot extends is bent at right angles to the plane of the portion 46 while the intermediate portion 52 which contains the slot 50 extends angularly between the portions 46 and 51.

The component 45 is applied to the wire component, which may be either of the two forms above described, by inserting the runs of the wires adjacent to a pair of the return bends therein through the slot 49 and thence into the slot 50; the leg portions of the wire component being momentarily sprung toward each other for this purpose and then being allowed to resume their normal position. Thus applied, the portion 51 rests against the wires with the portion 52 thereof resting on and supported by the selected pair of return bends as shown in Figs. 29 and 30 and with the portion 46 disposed at right angles to the length of the wires. In Fig. 29, the component 45 is shown applied to a wire component of the type shown in Figs. 26 and 27 with the end portions 44 thereof resting on the bottom of the container whereby the invention is adapted for use with relatively shallow containers with the brush holding component being adjustable to various set positions along the wire component as determined by the spacing and number of the return bend portions therein. In Fig. 30, the brush holding component is shown applied to a wire component 29 in conjunction with a container engaging component of the type shown in Fig. 23 to further illustrate the versatility of the third form of the invention. As in the case of the showing in Fig. 29, either form of wire component may be thus employed.

Referring finally to the third embodiment of the third form of the invention shown in fragmentary form in Fig. 31, there is shown a modification formed wholly of wire and comprising a main component 53 generally similar to the components 29 and 39 including a wire doubled on itself to form a loop end portion 54 a pair of parallel leg portions 55 and laterally extending parallel end portions 56; the leg portions being provided with opposed pairs of inwardly extending return bends 57. Associated with the component 53 is a separate brush holding component 58 comprising a length of wire bent into a closed loop 59 with the ends 60 of the wire crossing each other and thence extending in spaced parallel relation in the general plane of the loop to form a slot 61 in which a brush handle may be inserted and supported in the same manner as the previously described forms of the invention. The looped end of the component 53 may be plain as shown or it may be bent in a pair of reverse bends as shown in Figs. 26 and 27, if desired. Thus there has been created a paint brush holder which is extremely versatile in its use relative to the container of paint, solvent or the like. Moreover it is simple in construction and economical to manufacture. All of the described forms of the invention and the different illustrative embodiments thereof employ the principle of adjustable support of a brush relative to a container. The first form of the invention is simple but less versatile than the second form while the third form of the invention although requiring less material than the first two forms and possessing the simplicity and versatility of the first two forms is perhaps more expensive to manufacture. Thus the device is presented in a variety of forms which can accommodate a wide range of manufacturing requirements. For example, the first two forms of the invention require the provision of expensive dies and presses for production, while some embodiments of the third form of the invention may be manufactured with relatively inexpensive wire bending forms. While in the foregoing specification certain components of the invention have been described as being formed from sheet metal, it will be realized that the production thereof is not necessarily limited to sheet metal and that plastic materials molded or otherwise formed or diecastings may be employed in place of the sheet metal in many instances.

While the foregoing specification has described and illustrated certain embodiments of the invention, it is to be understood that the invention is not to be deemed to be limited to the exact embodiments thus disclosed, but that it includes all such modifications in the parts and in the construction, combination and arrangement of parts as shall come within the purview of the appended claims.

I claim:

1. A paint brush holder comprising a flat strip of malleable material bent at right angles adjacent to one end thereof transversely to the length of the strip with resultant formation of a shorter brush holding portion and a longer container engaging portion, a brush handle engaging slot in said brush holding portion, and a plurality of tongue elements formed in said container engaging portion at varying distances from said brush holding portion; said tongue elements being bendable out of the plane of said container engaging portion with resultant provision of container edge engaging elements effective to support said paint brush holder at any one of a plurality of elevations relative to the container; said brush handle engaging portion including flange portions extending substantially at right angles to the plane of said portion and forming the sides of said slot; the free edges of said flange portions being bendable toward and away from each other with resultant accommodation of said slot for brush handles of different sizes.

2. A paint brush holder comprising a flat strip of malleable material bent at right angles adjacent to one end thereof transversely to the length of the strip with resultant formation of a shorter brush holding portion and a longer container engaging portion, a brush handle engaging slot in said brush holding portion, and a plurality of tongue elements formed in said container engaging portion at varying distances from said brush holding portion; said tongue elements being bendable out of the plane of said container engaging portion with resultant provision of container edge engaging elements effective to support said paint brush holder at any one of a plurality of elevations relative to the container; said tongue elements comprising a first series of tongue elements longitudinally spaced along the medial longitudinal line of said container engaging portion and disposed with the free ends thereof extending toward said brush holding portion, and a second series of tongue elements comprising a plurality of oppositely disposed pairs of tongue elements extending along both side edges of said container engaging portion with the free ends thereof extending away from said brush holding portion.

3. A paint brush holder comprising a flat strip of malleable material having a slit extending longitudinally medially from one end thereof and terminating in a slit extending transversely thereto for substantially equal distances from the line of said first slit, a series of longitudinally extending tongues extending in spaced relation from the opposite end of said strip to a point adjacent said transverse slit; said strip being bendable at right angles to the length thereof at a point between said second named slit and the nearest adjacent of said tongues with resultant formation of a brush holding portion containing said slits and a supporting portion containing said tongues, said slits defining opposed flanges bendable out of the plane of said brush holding portion with resultant formation of a brush holding slot and the width of said slot being variable by the extent to which said flanges are bent toward or away from each other, and said tongues being bendable out of the plane of said strip selectively with resultant formation of a container edge engaging means at a selected distance from the brush holding means and consequent location of said brush holding portion at a selected elevation relative to the container edge.

References Cited in the file of this patent

UNITED STATES PATENTS

| | | |
|---|---|---|
| 419,585 | Crapo | Jan. 14, 1890 |
| 568,121 | Varian | Sept. 22, 1896 |
| 664,217 | Jencke et al. | Dec. 18, 1900 |
| 1,105,420 | Green | July 28, 1914 |
| 1,477,605 | Steigerwald et al. | Dec. 28, 1923 |
| 1,643,661 | Kendall | Sept. 27, 1927 |
| 1,797,084 | Frierson | Mar. 17, 1931 |
| 2,241,657 | Dehring | May 13, 1941 |
| 2,288,706 | Herr | July 7, 1942 |
| 2,402,374 | Corn et al. | June 18, 1946 |
| 2,450,736 | Pierce | Oct. 5, 1948 |
| 2,454,474 | Nance | Nov. 23, 1948 |
| 2,489,875 | Embree | Nov. 29, 1949 |
| 2,498,511 | Smith | Feb. 21, 1950 |
| 2,598,492 | Boes | May 27, 1952 |

FOREIGN PATENTS

| | | |
|---|---|---|
| 356,393 | Germany | Feb. 19, 1921 |